(12) United States Patent
Marshall

(10) Patent No.: US 8,935,243 B2
(45) Date of Patent: Jan. 13, 2015

(54) METHOD AND SYSTEM FOR DYNAMIC WEB DISPLAY

(75) Inventor: John Marshall, Stoney Creek (CA)

(73) Assignee: iNOVENTIV (Canada) Corp., Ontario (CA)

(*) Notice: Subject to any disclaimer, the term of this patent is extended or adjusted under 35 U.S.C. 154(b) by 701 days.

(21) Appl. No.: 12/758,255

(22) Filed: Apr. 12, 2010

(65) Prior Publication Data

US 2010/0262494 A1 Oct. 14, 2010

Related U.S. Application Data

(63) Continuation-in-part of application No. 10/926,974, filed on Aug. 27, 2004, now abandoned.

(60) Provisional application No. 60/497,915, filed on Aug. 27, 2003.

(51) Int. Cl.
*G06F 17/30* (2006.01)
*G06Q 30/02* (2012.01)
*H04L 29/08* (2006.01)

(52) U.S. Cl.
CPC ............ *G06Q 30/02* (2013.01); *G06Q 30/0251* (2013.01); *G06Q 30/0255* (2013.01); *H04L 67/20* (2013.01); *H04L 67/02* (2013.01); *Y10S 707/913* (2013.01); *Y10S 707/915* (2013.01)
USPC .......... 707/727; 707/769; 707/913; 707/915; 715/764; 705/14.4

(58) Field of Classification Search
CPC ............. G06F 9/45529; G06F 21/128; G06F 17/30861; G06F 17/30; G06F 3/0482
USPC .................. 707/727, 769, 913, 915; 715/764; 705/14.4
See application file for complete search history.

(56) References Cited

U.S. PATENT DOCUMENTS

| | | | |
|---|---|---|---|
| 6,236,977 B1 | 5/2001 | Verba | |
| 6,272,493 B1 | 8/2001 | Pasquali | |
| 6,321,209 B1 | 11/2001 | Pasquali | |
| 6,370,537 B1 | 4/2002 | Gilbert | |
| 6,379,251 B1 | 4/2002 | Auxier | |
| 6,397,208 B1 * | 5/2002 | Lee | 707/724 |
| 6,484,176 B1 * | 11/2002 | Sealand et al. | 1/1 |
| 6,496,857 B1 | 12/2002 | Dustin et al. | |
| 6,871,140 B1 | 3/2005 | Florance | |

(Continued)

FOREIGN PATENT DOCUMENTS

WO 02/21238 A2 3/2002

OTHER PUBLICATIONS

USPTO Office Action for U.S. Appl. No. 10/926,974 Dated Jan. 24, 2007 (26 pages).

(Continued)

*Primary Examiner* — Thanh-Ha Dang
(74) *Attorney, Agent, or Firm* — Conley Rose, P.C.

(57) ABSTRACT

A system and method for transacting retrieval of inventory data, such as real estate property listing(s), over an information network and dynamically transmitting the listing(s), in near or real time, to one or more subwindows of a web browser window. The listings contain customized rendering instructions that are encoded into an inventory data string and sent to an ad server that renders the listings in the subwindow according to the customized rendering instructions.

26 Claims, 9 Drawing Sheets

(56) References Cited

U.S. PATENT DOCUMENTS

| | | | |
|---|---|---|---|
| 6,981,224 | B1 | 12/2005 | Gardner |
| 6,985,902 | B2 | 1/2006 | Wise |
| 7,028,072 | B1 | 4/2006 | Kliger |
| 7,080,096 | B1 | 7/2006 | Imamura |
| 7,233,942 | B2 | 6/2007 | Nye |
| 7,418,412 | B2 * | 8/2008 | Schwartzman ............ 705/27.2 |
| 7,430,555 | B2 * | 9/2008 | Sealand et al. ........................ 1/1 |
| 7,640,204 | B2 * | 12/2009 | Florance et al. ............... 705/37 |
| 8,488,003 | B1 * | 7/2013 | Imes .......................... 348/207.1 |
| 2001/0003184 | A1 | 6/2001 | Ching |
| 2001/0043210 | A1 | 11/2001 | Gilbert |
| 2001/0049635 | A1 | 12/2001 | Chung |
| 2001/0056370 | A1 | 12/2001 | Tafla |
| 2002/0029178 | A1 | 3/2002 | Wiederin |
| 2002/0032603 | A1 | 3/2002 | Yeiser |
| 2002/0035494 | A1 | 3/2002 | Eckes |
| 2002/0038341 | A1 | 3/2002 | Mager |
| 2002/0049637 | A1 | 4/2002 | Harman |
| 2002/0049644 | A1 | 4/2002 | Kargman |
| 2002/0052925 | A1 | 5/2002 | Kim |
| 2002/0069105 | A1 * | 6/2002 | do Rosario Botelho et al. .............................. 705/14 |
| 2002/0082910 | A1 | 6/2002 | Kontogouris |
| 2002/0103698 | A1 | 8/2002 | Cantrell |
| 2002/0118883 | A1 * | 8/2002 | Bhatt ............................ 382/224 |
| 2002/0120505 | A1 | 8/2002 | Henkin |
| 2002/0133565 | A1 | 9/2002 | Huat |
| 2002/0152238 | A1 | 10/2002 | Hayes |
| 2002/0198778 | A1 | 12/2002 | Landsman |
| 2003/0014402 | A1 * | 1/2003 | Sealand et al. .................... 707/3 |
| 2003/0020758 | A1 | 1/2003 | Hinderks |
| 2003/0028419 | A1 | 2/2003 | Monaghan |
| 2003/0032409 | A1 | 2/2003 | Hutcheson |
| 2003/0033176 | A1 | 2/2003 | Hancock |
| 2003/0046385 | A1 * | 3/2003 | Vincent ........................ 709/224 |
| 2003/0078897 | A1 | 4/2003 | Florance |
| 2003/0085920 | A1 | 5/2003 | Belknap et al. |
| 2003/0101063 | A1 * | 5/2003 | Sexton et al. ...................... 705/1 |
| 2004/0030616 | A1 * | 2/2004 | Florance et al. ................ 705/27 |
| 2004/0054605 | A1 * | 3/2004 | Whittet ........................... 705/27 |
| 2004/0064477 | A1 * | 4/2004 | Swauger .................... 707/104.1 |
| 2004/0098465 | A1 | 5/2004 | Seo |
| 2004/0167928 | A1 * | 8/2004 | Anderson et al. .......... 707/104.1 |
| 2004/0260767 | A1 * | 12/2004 | Kedem et al. ................. 709/203 |
| 2005/0091111 | A1 * | 4/2005 | Green et al. ..................... 705/14 |
| 2005/0091127 | A1 | 4/2005 | Saltel |
| 2005/0091218 | A1 * | 4/2005 | Janes et al. ..................... 707/10 |
| 2005/0160002 | A1 | 7/2005 | Roetter |
| 2005/0203996 | A1 | 9/2005 | Shuster |
| 2005/0256766 | A1 | 11/2005 | Garcia |
| 2006/0031419 | A1 | 2/2006 | Huat |
| 2006/0106711 | A1 * | 5/2006 | Melideo .......................... 705/37 |
| 2007/0053513 | A1 | 3/2007 | Hoffberg |
| 2007/0064898 | A1 * | 3/2007 | Amano et al. ................ 379/168 |
| 2008/0086389 | A1 * | 4/2008 | Schwartzman ................ 705/27 |
| 2009/0006199 | A1 * | 1/2009 | Wang .............................. 705/14 |
| 2009/0094096 | A1 * | 4/2009 | Riise et al. ...................... 705/10 |
| 2009/0132316 | A1 * | 5/2009 | Florance et al. ................. 705/7 |
| 2010/0106606 | A1 * | 4/2010 | Filice et al. ................ 705/14.73 |
| 2010/0228592 | A1 * | 9/2010 | Anderson et al. ............. 705/10 |
| 2010/0268795 | A1 * | 10/2010 | Wood et al. ................... 709/219 |
| 2014/0040812 | A1 * | 2/2014 | Kurtz et al. ................... 715/781 |

OTHER PUBLICATIONS

May 24, 2007 Response to USPTO Office Action for U.S. Appl. No. 10/926,974 Dated Jan. 24, 2007 (35 pages).

USPTO Final Office Action for U.S. Appl. No. 10/926,974 Dated Sep. 4, 2007 (34 pages).

Oct. 23, 2007 Response to USPTO Final Office Action for U.S. Appl. No. 10/926,974 Dated Sep. 4, 2007 (28 pages).

USPTO Office Action for U.S. Appl. No. 10/926,974 Dated Mar. 13, 2008 (23 pages).

Apr. 24, 2008 Response to USPTO Office Action for U.S. Appl. No. 10/926,974 Dated Mar. 13, 2008 (29 pages).

USPTO Final Office Action for U.S. Appl. No. 10/926,974 Dated Jul. 23, 2008 (25 pages).

Dec. 18, 2008 Response to USPTO Final Office Action for U.S. Appl. No. 10/926,974 Dated Jul. 23, 2008 (29 pages).

USPTO Office Action for U.S. Appl. No. 10/926,974 Dated May 12, 2009 (37 pages).

Nov. 2, 2009 Response to USPTO Office Action for U.S. Appl. No. 10/926,974 Dated May 12, 2009 (37 pages).

USPTO Final Office Action for U.S. Appl. No. 10/926,974 Dated Feb. 12, 2010 (48 pages).

Canadian Patent Application No. 2,479,567; Office Action dated Dec. 15, 2010, 18 pages.

* cited by examiner

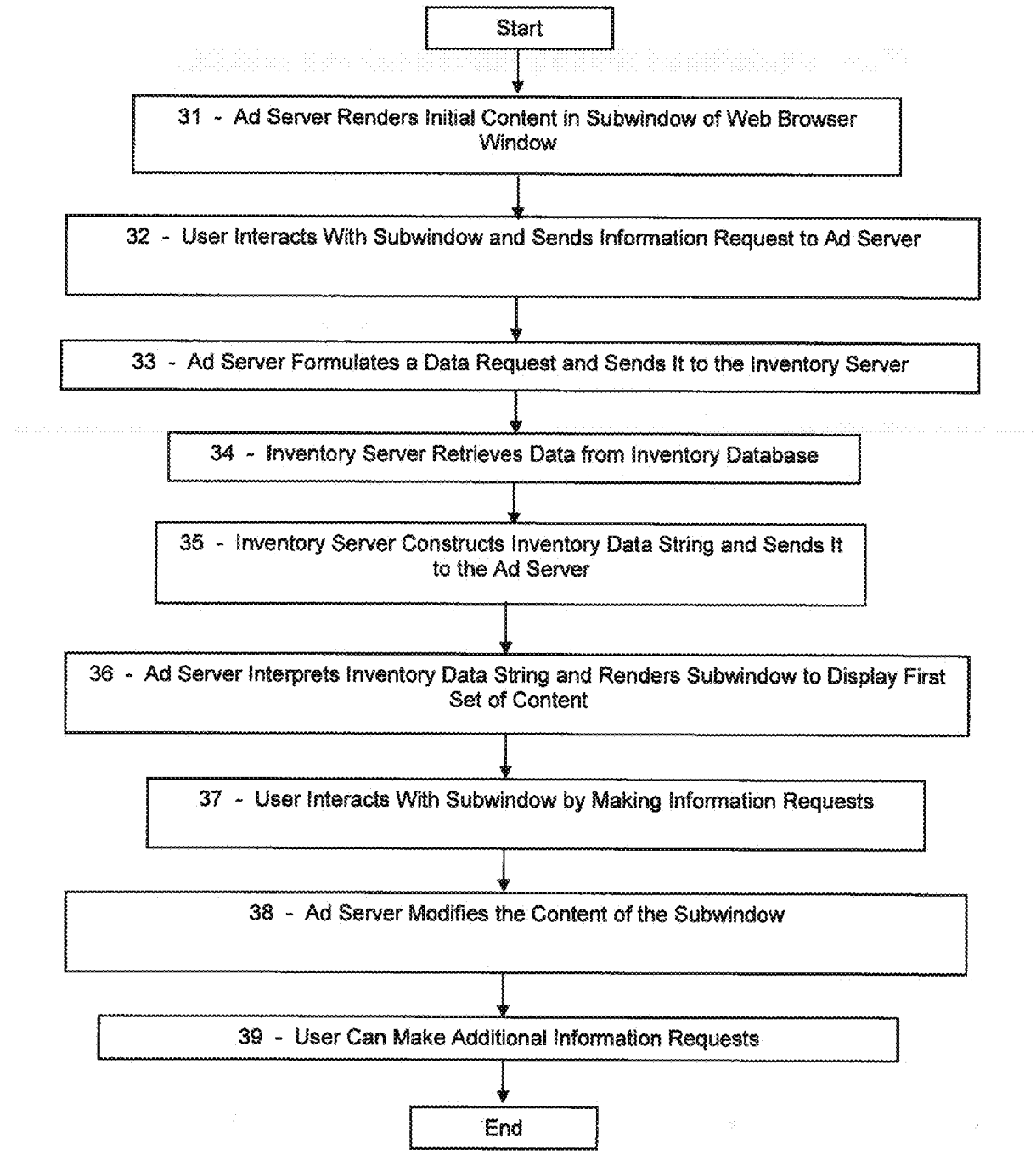

METHOD AND SYSTEM FOR DYNAMIC WEB DISPLAY

RELATED APPLICATIONS

This application is a continuation in part, and claims the benefit under 35 U.S.C. 120, of co-pending U.S. patent application Ser. No. 10/926,974, filed Aug. 27, 2004, which claims the benefit of U.S. provisional patent application Ser. No. 60/497,915, filed Aug. 27, 2003. These applications are incorporated by reference in their entirety for all purposes.

STATEMENT REGARDING FEDERALLY SPONSORED RESEARCH OR DEVELOPMENT

Not applicable.

FIELD OF THE INVENTION

The invention relates to a method and system for displaying classified and inventory-based listings within a browser window using Flash® technology on an electronic network.

BACKGROUND OF THE INVENTION

The use of databases for storing information relating to classified and inventory-based information has become widely accepted. Not merely is its popularity due to its ability to provide information to professionals in the industry, but also its potential as a means of disseminating information quickly and widely by using other technologies. One such area of application relates to real estate property.

The information in a listing for a piece of property may include a number of elements, including its price, postal address, physical characteristics of the property including number and type of rooms, the realtor responsible for marketing the property, and images of the property such as photographs, videos, and even virtual tours.

All such information, or a substantial part thereof, may be provided to a person using the Internet, or other electronic communications network, for display on a computer to the person in the form of a search result. The presented information may be static, such as text or a photograph, or dynamic, such as a video stream; it may be not merely visual, but also include audio.

Various approaches have been developed for displaying such information to a user. Interactive elements may be implemented, for example, using Java or JavaScript. These are both programming languages with syntaxes similar to the C programming language. JavaScript is a client-side scripting language whereas Java is a general-purpose programming language. Java is commonly used to code "applets" which consist of Java code compiled to Java bytecode that is downloaded and executed by a web browser using the Java run-time environment. These are well suited for use, and are often used, in conjunction with back-end and server side applications In contrast, Flash®, previously called Shockwave® Flash® and Macromedia® Flash®, is a set of multimedia technologies developed and distributed by Adobe Systems and earlier by Macromedia®. Flash® technology is a popular method for adding animation and limited interactivity to web pages but is not well suited for use in conjunction with back-end and server side applications. Flash® was designed as a vector-based web animation tool having few if any back-end or server side applications. Early versions of Flash® had very limited interactivity features and scripting ability. It was not until the release of Macromedia Flash® MX 2004 in September of 2003 that Flash® first included features such as web services integration and a scripting programming language well suited to the development of applications that interact with remote databases.

Advertising on the internet is generally impression based, the price being dependent on the number of times an advertisement is presented to a user. The current form of impression based random and interruptive advertising is time consuming, expensive and allows for significant waste in audience, engagement and media spend. Currently, ad units are targeted to individuals through these primary methods. First, Behavioral Targeting may be used, which uses information collected on an individual's web-browsing behavior, such as the pages they have visited, to select which advertisements to display to that individual. There are many privacy issues surrounding Behavioural Targeting. Second, Contextual Targeting where advertisements may be used that are selected and served by automated systems based on the content displayed to the user. And third, Vertical Content specific websites may be used in which advertisements are created and placed based on the content of the site. All of these forms of advertising placement are based on a suggested behavior and not individual consumer actual intent.

SUMMARY OF THE INVENTION

The invention provides a system for displaying listings to a user, the listings being provided by an advertiser, in a subwindow of a browser window, the system comprising:
  a. an inventory database containing listings including customized rendering instructions;
  b. an inventory server connected to a communications network for receiving data requests, retrieving one or more than one listing from the inventory database according to the data requests, and formatting the one or more than one listing into an inventory data string; and
  c. an ad server in electronic communication with the inventory server via the communications network, the ad server receiving information requests from the user, sending data requests to the inventory server, receiving inventory data strings from the inventory server, and rendering listings in the subwindow according to the customized rendering instructions received from the inventory server.

The ad server may be implemented as a Flash application.
The inventory data string may be an XML string.
A listing may include a plurality of images of a property and information about the property, and the customized rendering instructions may specify to the ad server the sequence in which to display the images and how to display the information in relation to the images. The customized rendering instructions may specify how the user may control the display by the use of controls displayed according to the customized rendering instructions.

The inventory server may further comprise a campaign management tool.

The inventory database may be updated for immediate display of updated listings to the user.

The system may further include a tracking server to record tracking data comprising user identifying information and user information requests wherein the system maintains a list of promotions, each promotion comprising one or more than one item for sale, and the system may display alerts to the user in the subwindow, each alert providing a link to view items in a promotion, where the system determines from the recorded tracking data that the user is a candidate for viewing the promotion. The system may determine that the user is a candidate for viewing a promotion by comparing the recorded user information requests with the items in the promotion to determine that the user has previously viewed similar items. The user identifying data may comprise demographic information about the user and the system may individualize the items in the promotion displayed to the user based on the demographic information and recorded user information requests.

The ad server may also receive a telephone number from the user and instruct a telephone system gateway to establish a telephone call between the user and a designated telephone number. The designated telephone number may be dynamically generated. The designated telephone number may be the telephone number of an agent or of a call center.

The invention also provides a method for displaying inventory data in a subwindow of a browser window to a user comprising the steps of:

a. receiving an information request for inventory data from the user;
b. sending a data request to an inventory server;
c. receiving an inventory data string from the inventory server containing one or more than one listing and customized rendering instructions; and
d. displaying the listings in a subwindow of the browser window according to the customized rendering instructions received from the inventory server.

The inventory server may use the internet to receive data requests and send inventory data strings containing customized rendering instructions.

The user may be able to control the display of inventory data.

The inventory data may be updated in real-time and available for immediate display to the user.

The method may further include the steps of recording tracking data comprising user identifying information and user information requests, comparing new user information requests to the tracking data to determine whether the user is a candidate to view a promotion comprising one or more than one item for sale, and displaying an alert to the user in the subwindow, the alert providing a link to view items in a promotion, if the user is determined to be a candidate to view the promotion. The method may determine whether the user is a candidate to view a promotion by comparing the recorded user information requests with the items in the promotion to determine that the user has previously viewed similar items.

The method may further include the steps of receiving a telephone number from the user and sending the user's telephone number along with advertisement data and agent data to a telephone system gateway to establish a telephone call between the user and a designated telephone number. The designated telephone number may be dynamically generated. The designated telephone number may be the telephone number of an agent or of a call center.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is an outline of the steps taken in a method according to one embodiment of the invention.

DETAILED DESCRIPTION OF THE INVENTION

Although the following discussion is directed primarily to real estate property listings, it will be clear to a person skilled in the art that any classified or inventory-based listings such as for cars/automobiles, clothing, jobs/recruitment, personals and travel are within the scope of this invention.

Figure 1:
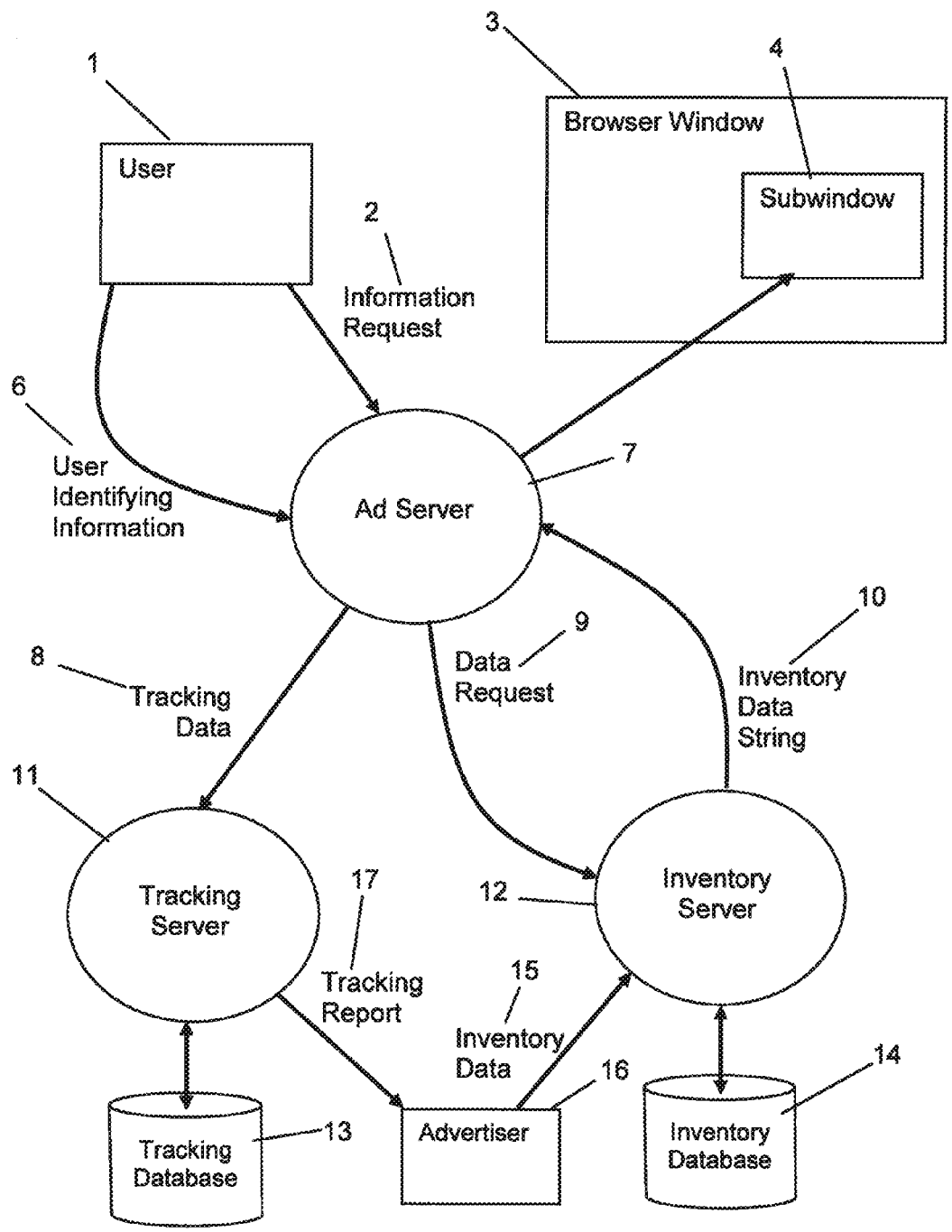
FIG. 1 is a schematic diagram depicting one embodiment of the system according to the invention.

With reference to FIG. 1, according to one embodiment of this invention, the system comprises three subsystems, or servers, which are the ad server 7, inventory server 10 and tracking server 11.

Each server may be a single computer system comprising a processor, network interface for accessing an electronic communications network (such as the internet), storage means such as semiconductor memories and hard disk drives, and software running on the processor to cause it to perform the described functions. Such a server may alternatively be a distributed system including multiple processors communicating via a communications network. Such a subsystem may alternatively be a purpose-built processor, or network of processors, comprising computer hardware designed to perform the functions described herein. In all cases, each embodiment of these servers is a particular machine that performs the described functions in the manner described herein as they would be understood by a skilled person. Furthermore, elements described as servers herein may be alternatively combined to share one or more processors. For example, the inventory server 12 and tracking server 11 could be implemented on a single processor with sufficient storage and processing capacity.

A user 1 typically accesses the internet via a web browser that renders browser windows 3 on the display screen of the user's computing device, such as a personal computer. The web browser interprets web pages, which may consist of source code comprising HTML instructions with embedded programs, such as scripts. The invention provides for the incorporation of subwindows 4 into a web page by the incorporation in the source code for the web page of instructions to run a program, or script, referred to as an ad server 7, to manage the subwindow 4. The source code may specify the portion(s) of the browser window that the ad server 7 can use as the subwindow 4, which may be a rectangular area having a height of a specified number of pixels and a width of a specified number of pixels. The ad server 7 then renders advertisements, and/or other information, in the subwindow 4, which the user 1 may interact with by entering information requests 2. A subwindow may also be referred to as a banner, particularly when it is aligned along one of the borders of the browser window 3.

A customized inventory repository server, or inventory server 12, which may include an inventory database 14, is connected to a communications network (such as the Internet). The inventory server 12 may accept inventory data 15 from an advertiser, or another database, via a real-time feed. Inventory data 15 may also be obtained by other means, such as by being entered directly by a data input device, or by periodic batch updates over the communications network. The inventory data 15 may contain a plurality of text data, numeric data, images, URLs/hyperlinks, rich media (including, but not limited to, creative artwork, streaming banners, video, and audio clips), as well as directives, or rendering instructions, on how, where, and when the inventory data is to be presented on a rich media advertisement. Each listing includes a data record set describing property listing information, which may be organized according to individual real estate agent. The data record set contains all rendering information such as ad display duration time, publisher selection, campaign ID, campaign duration, and listing(s) details.

The inventory data 15 returned to the ad server 7 in response to a data request 9 may include listings or modifications to listings that were made immediately before the data request 9 was received, and so allows for the immediate display to users of updated inventory data 15.

Prior to inventory data 15 being rendered for display via the Internet on a web page, it may undergo a multi-step approval process, which is a workflow allowing advertisers and administrators to verify data integrity and appropriateness. If inventory data 15 is being fed from a trusted source, the approval process may be waived for immediate release of rich media advertisements.

The ad server 7 may be a Flash® application, which may be a ".swf" file that is invoked by a script in the HTML code for a web page. For example, an online newspaper may sell portions of certain pages to advertisers. The newspaper may sell the rights to use a 400 by 300 pixel portion of its main real estate page to an advertiser. The advertiser may then provide the newspaper with a .swf file, or a URL pointing to a .swf file, that implements the ad server 7, or a part thereof. The paper may then modify its web page so that the .swf file is downloaded and executed by users' browsers when they load the main real estate page so that the ad server 7 may place advertisements in the subwindow 4 of the browser window 3 containing the newspaper's real estate page and receive input from the user 1. The .swf file may be stored on the newspaper's web server, or in some other location, but is executed and run, at least in part, on the user's computing device running the user's web browser equipped with a plug-in to run Flash® applications. The ad server 7 may alternatively be written in a scripting language, such as JavaScript, or in a high-level programming language, such as Java or C.

Flash® provides many advantages over a script-based approach. A Flash® application can be readily integrated with a publisher's web site and requires only the provision of a single file, which can be developed and tested completely separately from the web site programming. Also a Flash® application provides the ability to use Flash® cookies for tracking, which have advantages over normal browser cookies.

Figure 2A:
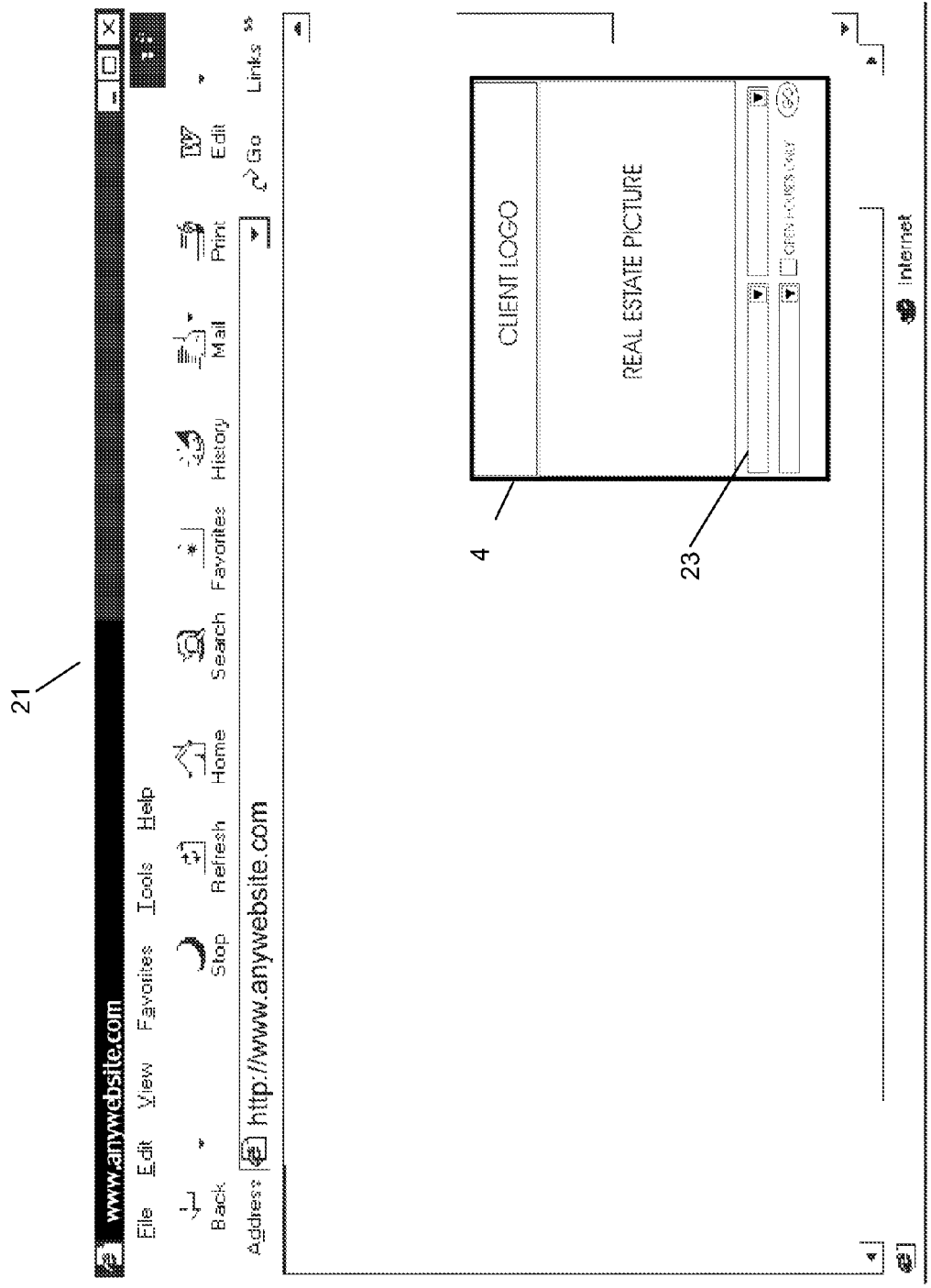
FIGS. 2a-2c are line drawings from the perspective of a user of one embodiment of the invention, depicting a web browser window containing a subwindow as the user interacts with the subwindow.

For example, the ad server 7 may render a subwindow 4 as shown in FIG. 2a showing the advertiser's company logo, a real estate picture, and a data entry area 23. The data entry area 23 may allow the user to select a location to search for real estate and to select parameter ranges, such as an upper and lower price range. After the user 1 clicks on a "go" button, or performs an equivalent action, indicating that all relevant parameters have been entered, the entered data comprises an information request 2 for the ad server 7. Referring to FIG. 1, the ad server 7 may then convert the information request 2 into a data request 9 suitable for submission to the inventory server 12. The inventory server 12, after receiving the data request 9, may then search listings in the inventory database 14 based on the parameters provided in the data request 9 to identify listings corresponding to the parameters entered by the user 1. Each listing may include information such as that shown in the subwindow 4 in FIG. 2b and FIG. 2c, which may include a picture of the property, a description of the property, the asking price, and the agent's name and picture.

A listing may contain a sequence of images, each having an associated description, such as one or more images of each room in the property, and the subwindow 4 may provide a control to allow the user 1 to rotate through the images, or the ad server 7 may play all the images as a slide show by default. Alternatively the listing may include one or more video clips of the property, which may have associated audio describing each image.

Instructions for rendering the various images, videos, text descriptions, audio files, and display controls are stored in the listings as customized rendering instructions for each listing. This may include, for each media element, such as an image, the duration to display the element, where to display the element within the subwindow 4, and what link(s) to associate with the element. The customized rendering instructions may also define relationships between elements, such as defining that a particular audio file should be played when a particular image is displayed, or by defining playlists of elements, each being displayed for a specified time in a specified manner. They may define how information, such as price or real estate agent name, is to be displayed in relation to the images. The customized rendering instructions may also include pre-defined randomization and/or weighting rules. Various graphical transitioning techniques may be used to transition between images or videos, and these may also be specified in the customized rendering instructions. The customized rendering instructions may be entered with the media elements as part of the inventory data 16 supplied by advertisers 16. Alternatively the customized rendering instructions may be created or modified by the inventory server 12.

It is an essential element of an embodiment of the invention that the customized rendering instructions be encoded in an inventory data string 10 that is encoded and provided by an inventory server 12 that is remote from the user 1 and the processor on which the user's browser is running. It is also an essential element of an embodiment of the invention that the customized rendering instructions determine how the multimedia elements in a listing are displayed to the user 1. The ad server 7, which may be co-located with the user, only interprets the customized rendering instructions to mechanically render the subwindow 4 and allow the user to control it as dictated by the customized rendering instructions. The ad server 7 may automatically perform operations such as interpolating images to make them fit in the subwindow, or a portion thereof, as directed by the customized rendering instructions. Some elements may include standard rendering instructions such as, for example, an animated GIF file that cycles though a series of images, displaying each for a specified period of time to create an animated image. Such rendering instructions are distinct from the customized rendering instructions, although the customized rendering instructions may be designed to take into account the known standard rendering instructions of such an element.

Figure 2B:
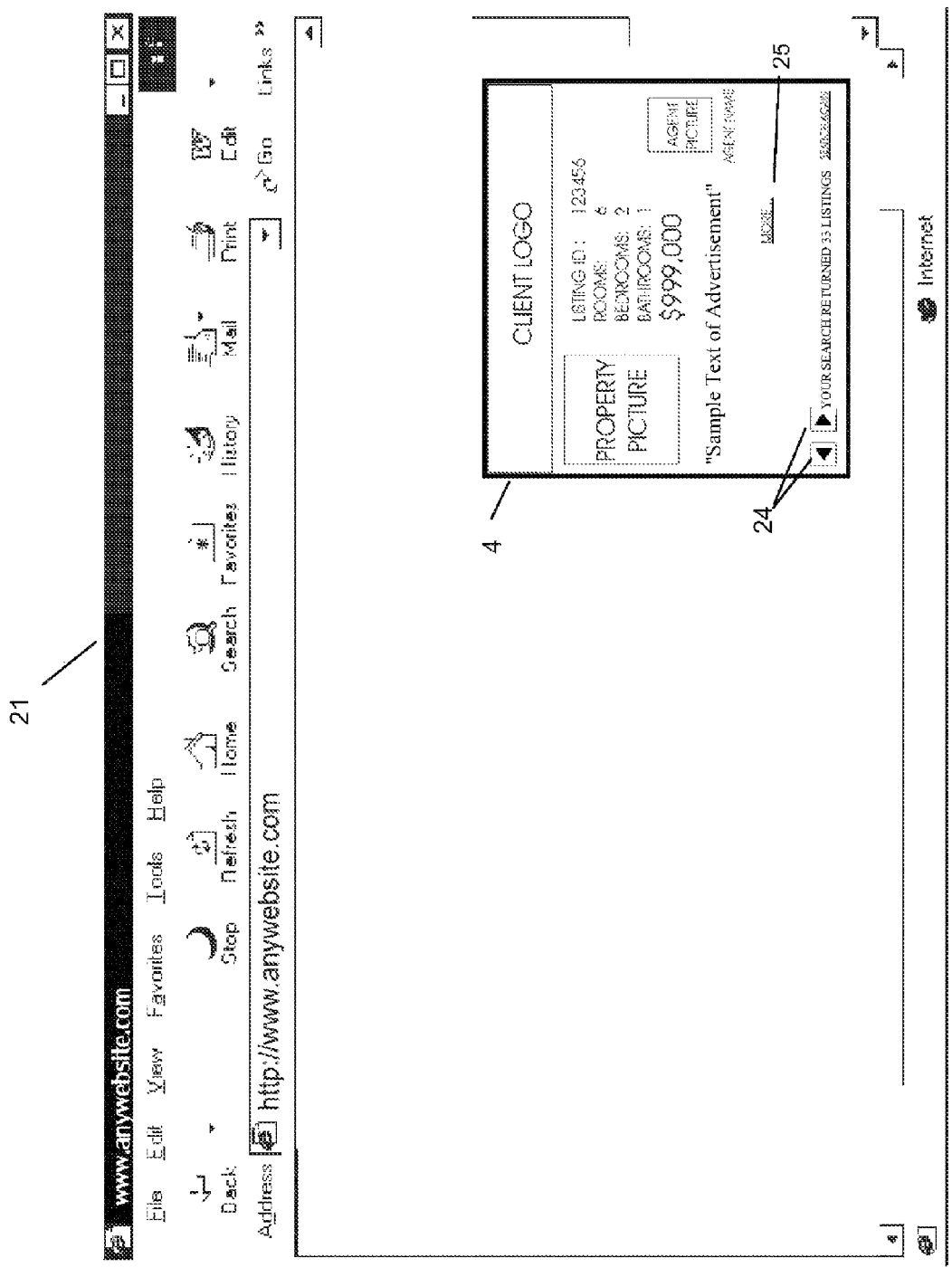
Figure 2C:
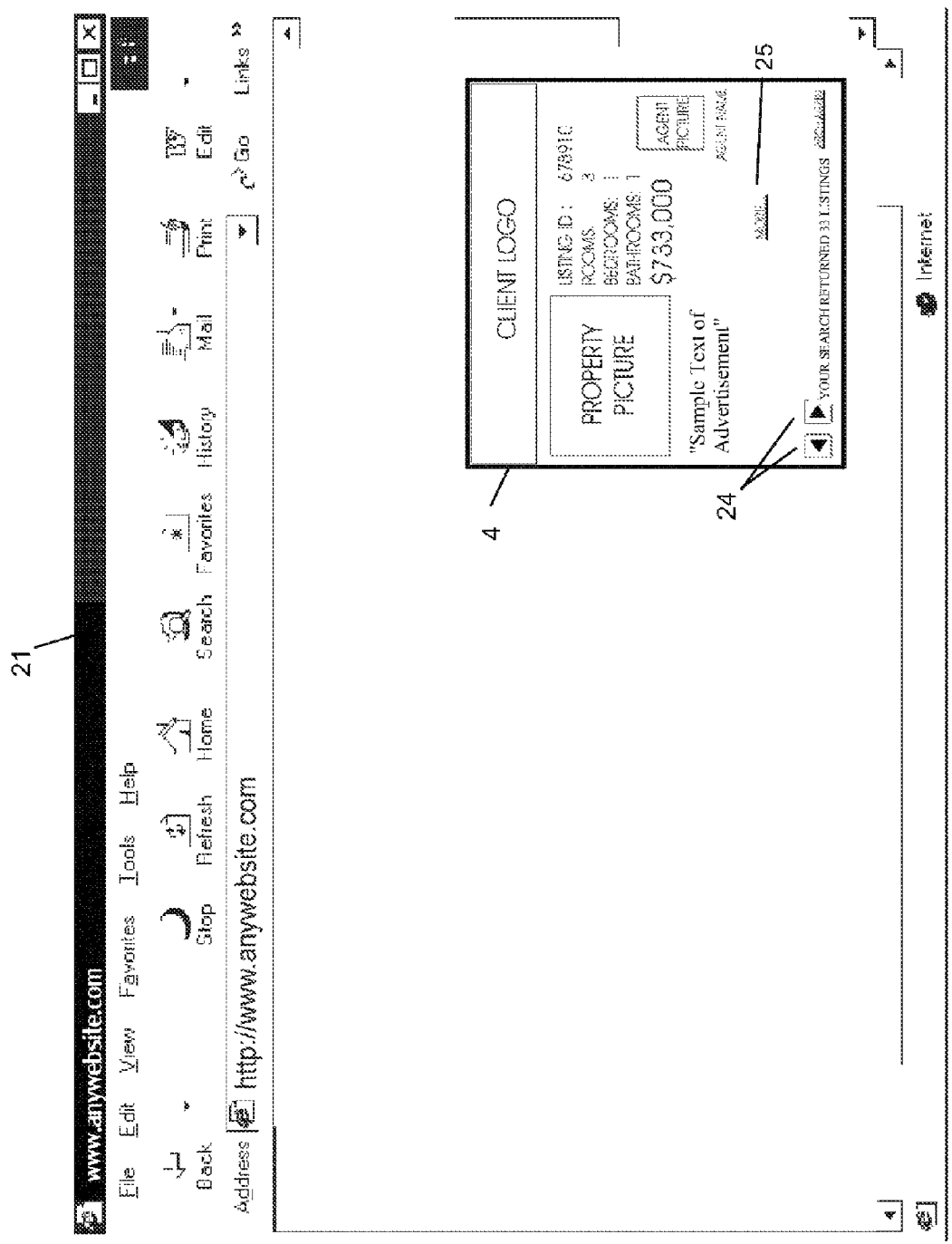

Referring to FIG. 2b and FIG. 2c, the subwindow 4 may also include a control 24 to allow the user 1 to switch to a different listing, or to conduct another search. For example, when the user 1 clicks on such a control 24, thereby making an information request 2, the ad server 7 may change the subwindow 4 from that shown in FIG. 2b to that shown in FIG. 2c, which figures display elements from two different listings. Alternatively, the user 1 may choose to obtain more information on the currently displayed listing by clicking on a link 25, for example entitled "MORE", in order to view information such as photographs of individual rooms and more detailed descriptions of the property described in the listing.

The inventory server 12 may take all the listings found in the inventory database 14 matching the data request 9, or a subset of those listings, and compile them into an inventory data string 10, which may be structured as XML having each listing as an element, and the images, other information and customized rendering instructions as sub-elements of each listing. Alternatively, the inventory server 12 may generate a series of inventory data strings 10. The inventory server 12 sends an inventory data string 10 back to the ad server 7 in response to the data request 9 and the ad server 7 may then interpret the inventory data string 10 to display listings in the subwindow 4, as described above, according to the customized rendering instructions contained in the inventory data string 10 for each listing.

The ad server 7 may obtain user identifying information 6 from the user 1 or from the user's computer. This may include, for example, an IP address or a user ID. It may further include demographic information that the user provides by interacting with a subwindow 4, such as the user's age and income level. The ad server 7 may generate a unique ID code for each new user and store that ID in a browser cookie on the user's computer that can be retrieved by the browser, or in a local shared object, or Flash® cookie, that is written and read by Flash® ActionScript. Alternatively, the ad server 7 may request that the user register using a dialog displayed in the subwindow 4, and create a unique user ID, such as the user's email address. The ad server 7 may then record the user's interactions with the ad server 7 and associate them with user identifying information 6, and other information such as the current date and time, to create tracking data 8. This tracking data 8 may be sent to a tracking server 11 for storage and analysis. Alternatively, or additionally, tracking data may be saved directly in a cookie on the user's computer. The tracking data 8 may be accumulated over many separate sessions involving interaction with a wide variety of advertisements, which may be unrelated to each other, other than by the fact they are presented by the ad server 7 to the user in a subwindow 4.

When a user 1 then opens a page having a subwindow 4 controlled by the ad server 7, the ad server 7 may first either retrieve tracking data 8 from a cookie, or obtain user identifying information 6. If the user 1 has previous tracking data 8 in the tracking database 13, the ad server 7 may retrieve this using the user identifying information 6 as an index. The ad server 7 may determine from the tracking data 8, for example, initial settings to use, and may formulate a data request 9 to the inventory server 12 based on the tracking data 8 to obtain an inventory data string 10 to use to initially render the subwindow 4. For example, the ad server 7 may determine which city, or neighbourhood, that the user 1 is probably interested in, and the price range, from the prior search information contained in the tracking data 8. The user may then be presented with a similar set of listings as that user previously requested, including any new inventory data 15 added since the previous request. The ad server 7 may choose to initially display only those listings added since the last recorded date that the user 1 made an information request 2, as determined by the date/time information in the tracking data 8 for that user. This may be done by formulating the data request 9 to the inventory server 12 to request only listings added or modified since the prior interaction with the user 1.

The technology provides for a unique method of displaying multimedia content, including graphics, photographs, and textual descriptions of each listing, as well as branding information for agents and brokers. It simplifies and expedites the process of producing online listing ads and is able to generate more web exposure (impressions) than traditional banner ads.

With further reference to FIG. 1, the components of the preferred embodiment include an inventory database 14 and an inventory server 12, which may accept listing updates on a real-time basis. The inventory server 12 may include a client campaign management tool and a system administrator module.

Listings are grouped together in "campaigns", and campaigns are targeted for display on one or more web properties. Each campaign may have custom creative content that further enhances the visual effects the displayed advertisement. Such creative content may be included in the inventory data string 10 with associated customized rendering instructions for each listing in a campaign that is returned to the ad server 7.

Listings can either be entered into the system by each agent using a controlled secure web interface, or in bulk fashion by processing uploads from a broker, or via a real-time feed. A web service may be used to permit the inventory server 12 to query advertiser databases directly to retrieve updated inventory data 15. As mentioned earlier, listings may move through a workflow to verify correctness, ensure that the content and photos are appropriate, and for final approval.

Unlike existing ad services, a person entering listing information need only provide listing descriptions and photos and not have to worry about artistic content. As a result, production costs are greatly reduced.

With reference to FIG. 3, when the user 1 loads a page containing a call to an ad server 7, the ad server first renders initial content in subwindow of web browser window 31. This may be some pre-defined default content, or may be user-specific if the ad server 7 identifies pre-existing tracking data 8 for the user 1, as discussed above. The user interacts with the subwindow and sends an information request to the ad server 32 to request information on properties with some specified parameters. The ad server then formulates a data request and sends it to the inventory server 33, after which the inventory server retrieves data from the inventory database 34 and then constructs an inventory data string and sends it to the ad server 35. The ad server interprets the inventory data string and renders the subwindow to display a first set of content for a listing 36. Then the user interacts with the subwindow by making information requests 37 and the ad server modifies the content of the subwindow 38 accordingly, for example to show other listings. The user can make additional information requests 39 by changing the parameters of the information request.

By default, all listings have equal exposure on the targeted web properties, although listings can be weighted for more or less exposure on various web properties.

Owners of listings are able to check the exposure (impressions) that a listing has had (e.g. how many times a user has viewed a given listing), as well as determine how many users "click-thru" the ad to get more listing details at a pre-specified web address. They can also check statistics such as how long users spent viewing a listing and the total time spent per session viewing listings of an advertiser 16. Other examples include the total time a user has spent viewing ads of a certain type, such as property style or property price range over a certain price. Such statistics are generated by the tracking server 11 and may be summarized in tracking reports 17 for each campaign that are provided to advertisers 16. Such statistics may be used to determine which ads to display to a user and pre-qualify a user to see certain advertisements.

The tracking data 8 may include user search history information, based on searches as specified by user requests comprising information requests 2 entered by a user 1 using any instantiation of the ad server 7. This may include information on searches made on multiple sites using different advertising subwindows 4. For example, a single user may interact with a subwindow 4 containing information on real estate provided by one advertiser 16 and, at a previous time, have interacted with a subwindow 4 containing listings of clothing, such as sleeveless shirts, that were provided by a different advertiser 16. The tracking data 8 would then contain information about what was searched for each advertiser 16.

The inventory server 12 may maintain lists of promotional items, sales or other events that are provided by an advertiser 16. For example, retailer X may have a promotion whereby the price of certain sleeveless shirts is discounted for a certain period. When the user 1 begins to interact with a subwindow 4, the ad server 7 may retrieve the tracking data 8 from a cookie or from the tracking server 11. Then the ad server 7 may compare the user's search history with the list of sales and promotions. If the user 1 had previously searched for sleeveless shirts, the ad server 7 may determine that the user 1 is a candidate for viewing retailer X's promotion. A candidate for viewing such a promotion may be someone who has searched for items that are comparable to those items that are the subject of the promotion, as indicated by the search history contained in the tracking data 8. Candidates may also be identified by other means, such as by comparison with data provided by a user, which could include information such as the user's age and income level. For example, if the user has a relatively high income level, the ad server 7 may present more expensive items to the user initially.

Figure 4:
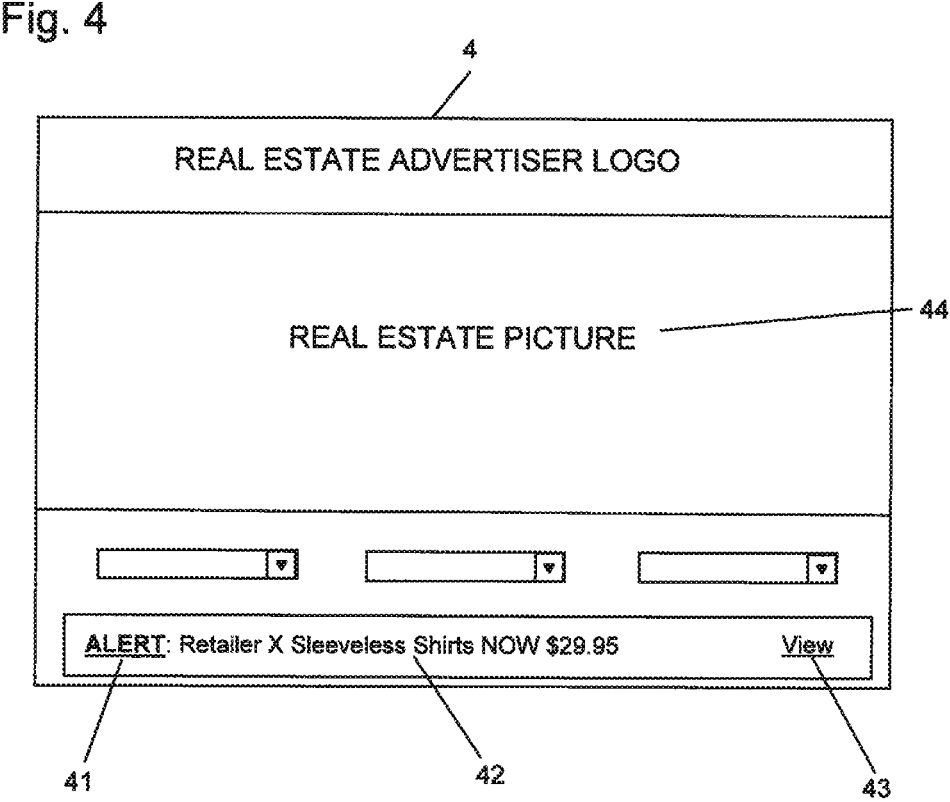
FIG. 4 is a line drawing from the perspective of a user of one embodiment of the invention showing a subwindow containing an alert.
Figure 5:
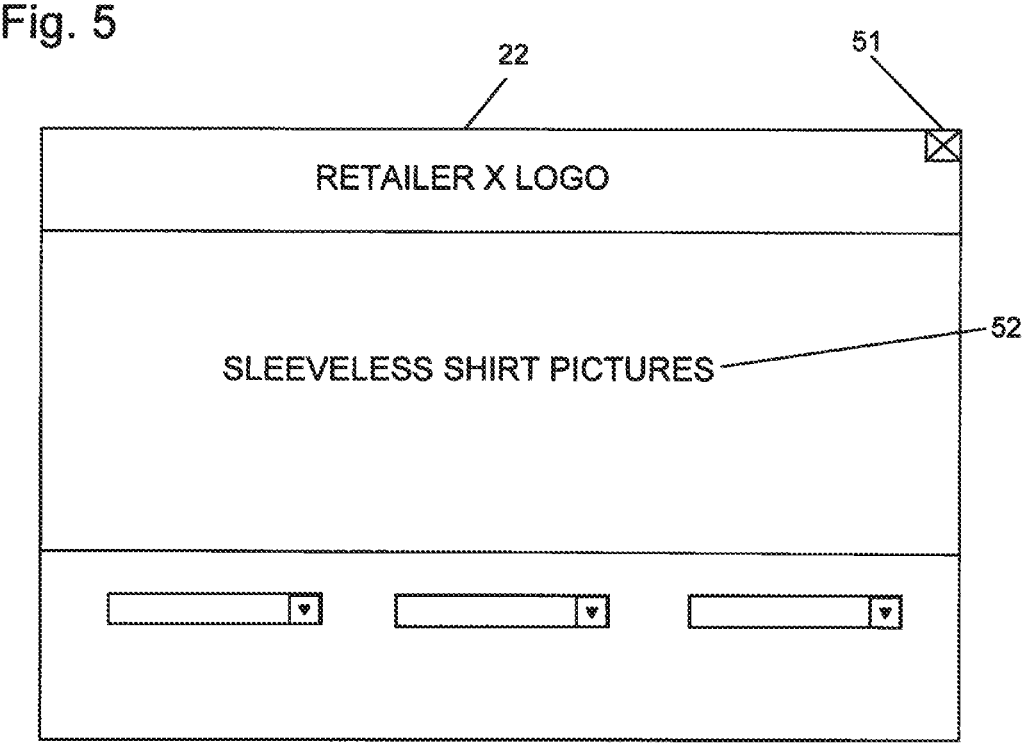
FIG. 5 is a line drawing from the perspective of a user of one embodiment of the invention showing a subwindow with a close control.

If a user 1 is determined to be a candidate for viewing retailer X's promotion then, while the user 1 is perusing some other advertisements, such as real estate listings in a subwindow 4, the ad server 7 may generate an alert 41 that may appear in a portion of the subwindow 4. An example of this is shown in FIG. 4, where the user is currently looking at real estate pictures 44, and the ad server 7 has determined that the user 1 is a good candidate for retailer X's sale of sleeveless shirts. In this case, the ad server 7 inserts an alert 41 at bottom of the subwindow 4, providing a brief description 42 of the sale, and a link 43 entitled "View". If the user 1 clicks on the link 43, then, as depicted in FIG. 5, the ad server 7 displays an advertisement from retailer X for the discounted sleeveless shirts, showing pictures of retailer X's sleeveless shirts 52 and pricing information in a modified subwindow 4 that replaces or overlays the subwindow 4 showing the real estate pictures 44. The content of the subwindow 4 may be individualized based on the user's search history, for example based on the price ranges within which the user previously searched or based on the user's income level. The user may then interact with the subwindow 4 to peruse the sale items. The subwindow 4 may contain a control 51 that the user 1 may click in order to close the subwindow 4. If the user 1 closes the subwindow 4, the ad server 7 may then revert to displaying the real estate pictures 44 that the user 1 was perusing before clicking on the link 43 to view the information indicated by the alert 41.

The content of a subwindow 4 may be individualized in many other ways based on the user's search history. The invention will revolutionize the way online ad campaigns are created, deployed and viewed. By capturing enough of a demographic outline, through previous search preferences, advertising that is now ignored will be transformed into individually customized ad units. When a consumer performs a search within a subwindow 4, the search results appear in the subwindow 4. The demographic search information is captured to push the same search results in the form of alerts, at a later time in disparate placements, to any or all advertising campaigns.

This approach goes far beyond prior Behavioral Targeting approaches. Unlike simple Behavioral Targeting, all the tracking information used is based on actions by a user interacting with a subwindow, performing actions that indicate the user's actual interest in particular items or products. This permits advertisements to be crafted and dynamically displayed on an individual basis to greatly enhance the targeting of that content to a user and the likelihood that a user will be interested in the advertisements and make a purchase.

For example, if Consumer A performs a search in a Real Estate Brand, the real time listings appear to Consumer A in the subwindow 4 where the search is performed. If the results change in any way, such as a price drop, open house, contract signed etc., an alert may appear to Consumer A when that user is viewing any advertisement in a subwindow 4 for any brand in any placement. Consumer A then has the choice to view the alert by clicking on a provided link. Following Consumer A's engagement with the Real Estate Brand alert, the subwindow 4 reverts back to the brand being viewed before the alert was introduced. Advertisers and media buyers can thereby dynamically optimize their media spend, to the individual user, making saturated 'spray and pray' internet campaigns obsolete.

Figure 6:
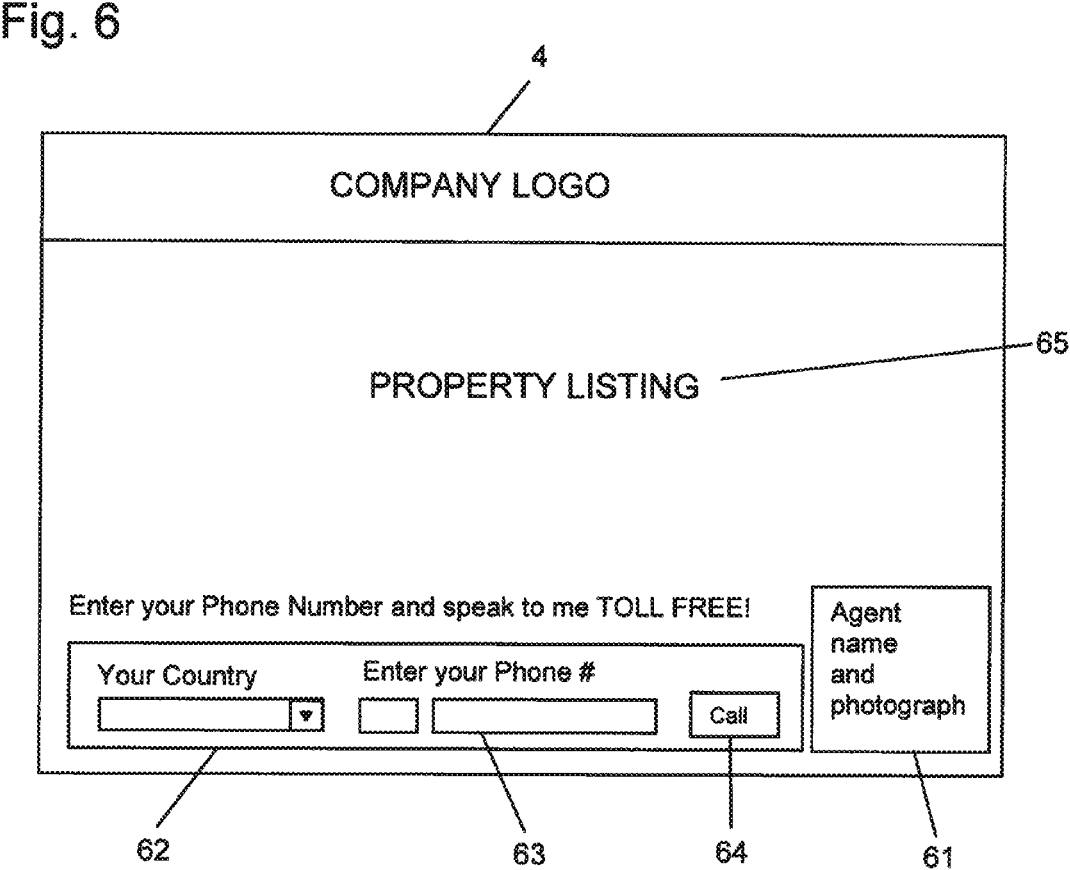
FIG. 6 is a line drawing from the perspective of a user of one embodiment of the invention showing a subwindow with a contact entry portion.

In another embodiment, as depicted in FIG. 6, agent information may be included in a subwindow to identify a person or entity who may be dynamically contacted to obtain information about the product or service described in the subwindow 4. This may include a name and photograph of an agent 61, such as a real estate agent in the case of a real estate property listing 65, as well as contact information. There may be multiple agents associated with a property listing 65 with a priority scheme for the system to determine which agent's name and picture 61 to display in association with the property listing 65. The system may further monitor status information that shows whether each agent is online and choose to display the name and photograph of an agent 61 who is currently online, where at least one agent is online.

Figure 7:
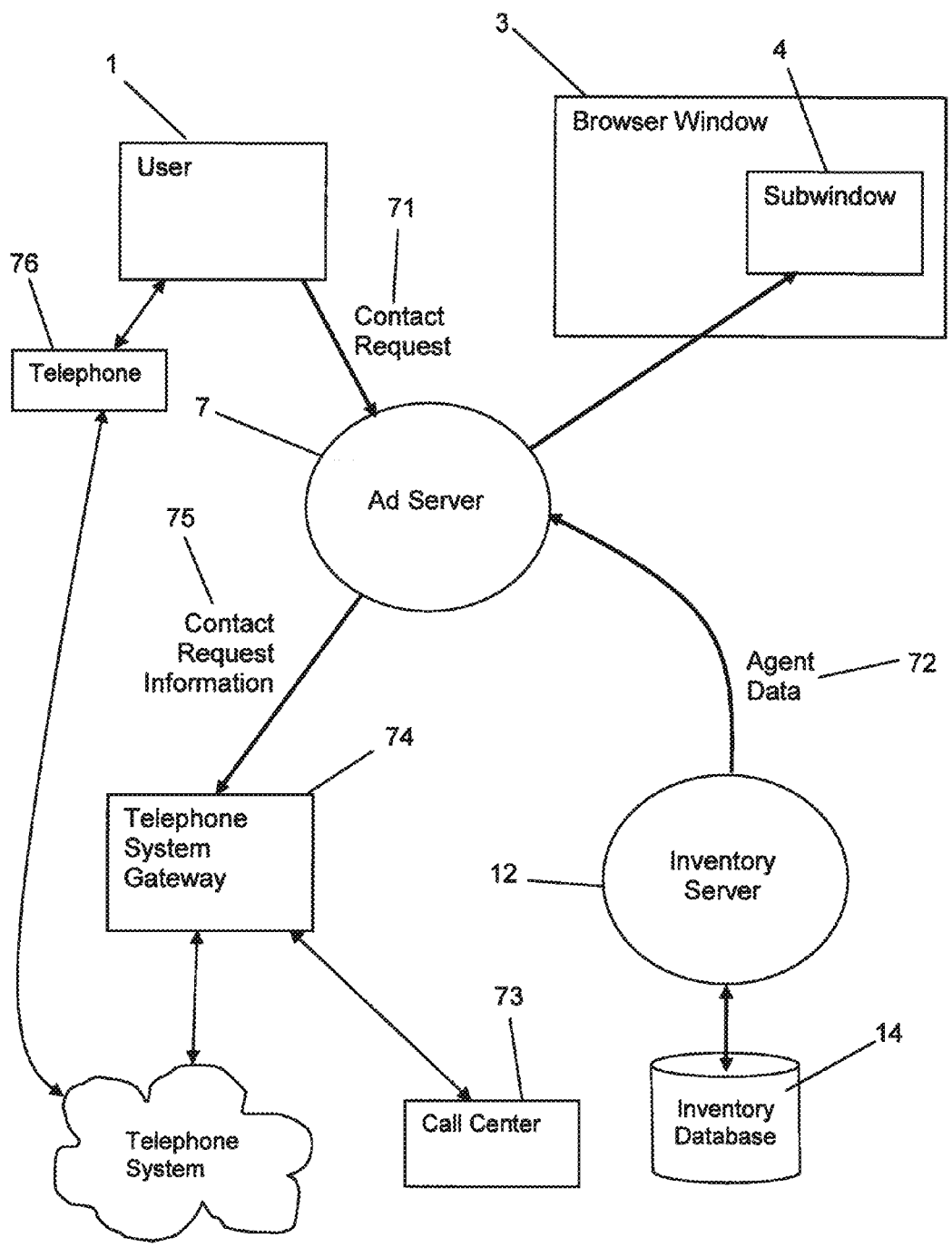
FIG. 7 is a schematic diagram depicting some of the functionality of one embodiment of the system related to establishing a telephone call between a user and a call center.

The subwindow 4 may further incorporate a contact entry portion 62 that permits the user 1 to contact the agent and request additional information. For example, as shown in FIG. 6, the contact entry portion 62 may provide for the entry of a telephone number 63 and have a call button 64. In that example, when the call button is selected, the telephone number may be sent to a telephone system gateway 74 along with the agent's contact information, identification of the product or service that the user was viewing at the time of the request and any available user identifying information 6. The telephone system gateway 74 would then initiate contact between the user and the agent. In the case where a user's telephone number is entered, the system could send the telephone number 63 to the agent for the agent to follow up on, or could immediately initiate a telephone call from the agent to the user. For example, if the agent's status indicates that the agent is online, the user's number may be dialed by a telephone system gateway 74, as depicted in FIG. 7, to initiate a call from the online agent to the user's telephone 76. If no agent associated with a listing is online, the system may initiate a call between the phone number 63 entered by the user and a designated voice mailbox or other telephone number, such as that of an assistant to an agent or a call center.

More generally, rather than a specific agent, the system may initiate a call from a designated telephone number to the user 1. The designated telephone number may be that of a call center 73 as shown in FIG. 7, which may be a normal telephone system number, or may be an address of a web-based phone or call center. The designated telephone number may be dynamically generated. The agent data 72 may be retrieved from the inventory database 14 by the inventory server 12 along with the advertisement data that is displayed in the subwindow 4. The agent data 72 contains contact information that specifies a number or electronic address of an agent or call center 73. The agent data may also include an agent's name and photograph 61, or other information or graphics, to be displayed in the sub-window 4. When the user makes a contact request 71, by entering a telephone number 63 and pressing the call button 64, the ad server 7 may send contact request information 75 to a telephone system gateway 74 to initiate a call between the agent or call center 73 and the user 1 via the user's telephone 76. The contact request information 75 may include user identifying information 6 and advertisement data describing the advertisement that the user 1 was viewing, which information may be provided to the agent or call center 73 before or when the call is initiated, as well as agent contact information from the agent data 72 and the user's telephone number 63 to be used by the telephone system gateway 74 to establish the call.

Rather than a standard telephone 76, the system may alternately obtain contact information for, and connect the agent or call center 73 to, a user's web-based phone using his or her PC, Mac or browser enabled mobile phone. In that case, the user's telephone number may be the contact information for a web-based phone, such as an IP address or e-mail address, for example.

It will be appreciated that the subwindow 4 may not be a fixed rectangular portion of a window controlled by a web browser, or may in fact comprise the entire browser window. A subwindow 4 may have multiple parts and varying shapes.

It will be appreciated that embodiments of the invention provide for a transformation of computer memories and displays that is directly analogous to the transformation of other physical objects, such as an advertising billboard, by the incorporation of advertising or messages thereon. The software comprising each server is a sequence of bits comprising encoded instructions for processors that interpret the encoded instructions and thereby run the server. Such software is stored in computer-readable memories, or storage means, such as: hard disk drives; semiconductor devices such as read-only memories, random access memories, flash memories and solid state drives; and optical storage means such as CDs and DVDs. The invention provides for the transformation of such physical devices (computer-readable memories). The storage of the software in such memories physically transforms those memories so that a portion of them encodes the data in a form that can be retrieved and run by a processor. Embodiments of the invention thereby transform the physical object which is computer-readable memory or memories containing software. Embodiments of the invention further transform the physical object that is the user's display device by causing it to display advertisements and information inserted in a manner analogous to placing an advertisement on a portion of a billboard.

It will be appreciated that the above description relates to the preferred embodiments by way of example only. Many variations on the system and method for delivering the invention without departing from the spirit of same will be clear to those knowledgeable in the field, and such variations are within the scope of the invention as described and claimed, whether or not expressly described.

The invention claimed is:

1. A system for displaying listings to a user, the listings being provided by an advertiser, in a subwindow of a browser window, the system comprising:
   an inventory database containing listings, each listing being for one property, each listing including:
      a plurality of images of the property;
      a description of each image;
      information about the property including a price; and
      customized rendering instructions that specify:
         a sequence in which to display the images in the listing;
         a position relative to the image in which to display the description of each image;
         one or more graphical transitioning techniques to use when transitioning between displayed images; and
         how to display the information about properties in relation to the images,
         wherein the customized rendering instructions are not contained in an animated GIF file;
   an inventory server, remote from the user, connected to a communications network and configured to:
      receive data requests;
      retrieve one or more than one listing from the inventory database according to each data request; and
      format the one or more than one listing into an inventory data string; and
   an ad server, remote from the inventory server, in electronic communication with the inventory server via the communications network, the ad server configured to:
      receive information requests from the user;
      send data requests to the inventory server based on the user information requests;
      receive inventory data strings from the inventory server in response to the data requests; and
      for each received inventory data string, render each listing in the inventory data string in the subwindow according to the customized rendering instructions encoded in the inventory data string received from the inventory server, wherein, for each listing, the ad server:
         displays the images in the subwindow in the sequence specified in the customized rendering instructions provided by the inventory server;
         applies the one or more transitioning techniques as specified in the customized rendering instructions to transition between displayed images;
         displays the description of each image in the position relative to the image specified in the customized rendering instructions; and
         displays the information including the price in the manner specified in the customized rendering instructions,
      wherein the inventory data is updated on a real-time basis.

2. The system of claim 1 wherein the ad server is implemented as a Flash application.

3. The system of claim 1 wherein the inventory data string is an XML string.

4. The system of claim 1, wherein the customized rendering instructions further specify how the user may control the display by the use of specific controls, and the ad server displays the specific controls according to the customized rendering instructions encoded in the inventory data string received from the inventory server.

5. The system of claim 1 wherein the inventory server further comprises a campaign management tool.

6. The system of claim 1 wherein the inventory database is updated for immediate display of updated listings to the user.

7. The system of claim 1 further comprising a tracking server to record tracking data comprising user identifying information and user information requests wherein the system maintains a list of promotions, each promotion comprising at least one item for sale, and the system displays alerts to the user in the subwindow, each alert providing a link to view the at least one item in a promotion, where the system determines from the recorded tracking data that the user is a candidate for viewing the promotion.

8. The system of claim 7 wherein the system determines that the user is a candidate for viewing a promotion by comparing the recorded user information requests with the at least one item in the promotion to determine that the user has previously viewed similar items.

9. The system of claim 7 wherein the user identifying data comprises demographic information about the user and the system individualizes the at least one item in the promotion displayed to the user based on the demographic information and recorded user information requests.

10. The system of claim 1 wherein the ad server receives a telephone number from the user and wherein the ad server instructs a telephone system gateway to establish a telephone call between the user and a designated telephone number.

11. The system of claim 10 wherein the designated telephone number is the telephone number of an agent.

12. The system of claim 10 wherein the designated telephone number is the telephone number of a call center.

13. A method performed by an ad server for displaying inventory data in a subwindow of a browser window to a user comprising the steps of:
receiving, by the ad server, an information request for inventory data from the user;
sending, by the ad server, a data request to an inventory server;
receiving, by the ad server, an inventory data string from the inventory server containing one or more than one listing including information about properties, each listing being for one property, the information for each listing including (a) images of the property, (b) descriptive information about the property, and (c) customized rendering instructions that specify the sequence in which to display the images the listing and how to display the descriptive information in relation to the images, the customized rendering instructions not being contained in an animated GIF file; and
for each listing, displaying, by the ad server, the images in the listing in a subwindow of the browser window in the sequence specified in the customized rendering instructions encoded in the inventory data string received from the inventory server along with the descriptive information as specified in the customized rendering instructions.

14. The method of claim 13 wherein the inventory server uses the internet to receive data requests and send inventory data strings containing customized rendering instructions.

15. The method of claim 13 wherein the inventory data string is an XML string.

16. The method of claim 13 wherein the inventory data comprises listings, each listing comprising a plurality of images of a property and information about the property, and wherein the customized rendering instructions specify the sequence in which to display the images and how to display the information in relation to the images.

17. The method of claim 13 wherein the customized rendering instructions further specify how the user can control the display of inventory data by the use of specific controls, and the ad server displays the specific controls according to the customized rendering instructions encoded in the inventory data string received from the inventory server.

18. The method of claim 13 wherein the inventory data is updated in real-time and available for immediate display to the user.

19. The method of claim 13 further comprising the steps of recording tracking data comprising user identifying information and user information requests, comparing new user information requests to the tracking data to determine whether the user is a candidate to view a promotion comprising at least one item for sale, and displaying an alert to the user in the subwindow, the alert providing a link to view items in a promotion, if the user is determined to be a candidate to view the promotion.

20. The method of claim 19 wherein determining whether the user is a candidate to view a promotion comprises comparing the recorded user information requests with the at least one item in the promotion to determine that the user has previously viewed similar items.

21. The method of claim 19 wherein the user identifying data comprises demographic information about the user and the at least one item in the promotion displayed to the user is individualized based on the demographic information and recorded user information requests.

22. The method of claim 13 further comprising the steps of:
receiving a telephone number from the user; and
sending the telephone number received from the user along with advertisement data and agent data to a telephone system gateway to establish a telephone call between the user and a designated telephone number.

23. The method of claim 22 wherein the designated telephone number is the telephone number of an agent.

24. The method of claim 22 wherein the designated telephone number is the telephone number of a call center.

25. The method of claim 13 wherein the properties include real estate properties.

26. The method of claim 13 wherein the properties include automobiles.

* * * * *